(12) United States Patent
Greenblatt (10) Patent No.: US 7,467,921 B2
(45) Date of Patent: Dec. 23, 2008

(54) VORTEX CONTROL FOR ROTOR BLADE DEVICES

(75) Inventor: David Greenblatt, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 630 days.

(21) Appl. No.: 11/239,436

(22) Filed: Sep. 22, 2005

(65) Prior Publication Data

US 2008/0003103 A1    Jan. 3, 2008

Related U.S. Application Data

(60) Provisional application No. 60/615,211, filed on Sep. 23, 2004.

(51) Int. Cl.
*B64C 27/615* (2006.01)
(52) U.S. Cl. .............................. 416/1; 416/23
(58) Field of Classification Search .............. 416/1, 416/3, 23, 24, 228, 229 R, 230, 241 R, 500
See application file for complete search history.

(56) References Cited

U.S. PATENT DOCUMENTS

| 6,171,056 | B1 * | 1/2001 | Lorber | 416/42 |
| 6,461,106 | B1 * | 10/2002 | Rahier | 416/1 |
| 6,474,945 | B1 * | 11/2002 | Nakasato et al. | 416/23 |
| 6,478,541 | B1 * | 11/2002 | Charles et al. | 416/23 |

* cited by examiner

*Primary Examiner*—Igor Kershteyn
(74) *Attorney, Agent, or Firm*—Helen M. Galus; Barry V. Gibbens

(57) ABSTRACT

To control vortices originating at the tips of a rotor's blades rotating through the air at a revolution frequency f, separation control device(s) are actuated to periodically introduce perturbations into the airflow moving over the blades. The periodic introduction of perturbations is controlled in accordance with a periodic modulating frequency of introduction $f_0$ while the frequency of the perturbations so-introduced is designated as $f_e$. Vortex control is achieved when the periodic modulating frequency of introduction $f_0$ satisfies the relationship $$nf \leq f_0 \leq f_e$$

where n is the number of blades.

16 Claims, 6 Drawing Sheets

VORTEX CONTROL FOR ROTOR BLADE DEVICES

ORIGIN OF THE INVENTION

The invention described herein may be manufactured and used by or for the Government of the United States of America for governmental purposes without the payment of any royalties thereon or therefor.

BACKGROUND OF THE INVENTION

1. Field of the Invention

This invention relates to rotor blade devices. More specifically, the invention is a method and a system for controlling vortices produced by rotating blades such as those found on rotorcraft.

2. Description of the Related Art

Significant noise and efficiency problems are caused by the vortices that trail in the wakes of rotary wing aircraft or rotary bladed equipment. For example, on rotary wing aircraft (also known as "rotorcraft"), a major source of noise and vibration arises from the interaction of rotor blade tip-vortices with succeeding blades, the airframe, empennage and tail rotor of the vehicle. In particular, blade-vortex interaction (BVI) is responsible for most of the sound pollution caused by helicopters, particularly during low-speed landing approach and maneuvers. Tip flows also present significant problems for rotary bladed equipment such as turbomachinery (e.g., axial compressors, fans and blowers). As much as 30% of the losses in a turbomachine can be attributed to the clearance flow near the tip of the rotating element. In addition, tip-clearance induced noise, both in the form of rotor self noise and rotor-stator interaction noise, constitutes a significant component of total fan noise.

With respect to rotorcraft, there are two main approaches for BVI noise reduction. The first approach involves the passive or active reduction in vortex intensity or strength while simultaneously increasing vortex core size. Passive devices such as spoilers, winglets and vortex generators have been proposed, while active methods such as surface and tip blowing have also been investigated. One of the key problems associated with these current devices and methods is that they invariably result in a degradation of overall rotorcraft performance. For example, passive devices such as spoilers increase drag. Surface blowing reduces blade loading while tip blowing requires large power supplies to supply blowers.

The second approach to BVI noise reduction involves increasing the distance between the vortex and the rotor blade thereby minimizing the interaction. Techniques proposed include the use of active flaps, higher harmonic control of blade pitch, or individual blade control. In these cases, reductions in BVI noise have been reported, but the inputs that are required to drive the BVI noise reduction systems can themselves promote and increase vibrations.

SUMMARY OF THE INVENTION

Accordingly, it is an object of the present invention to provide a method and system for controlling vortices at the tips of a rotor's blades.

Another object of the present invention is to provide a method and system that reduces blade-vortex interaction effects for rotary blade devices such as rotorcraft.

Other objects and advantages of the present invention will become more obvious hereinafter in the specification and drawings.

In accordance with the present invention, a system and a method are provided for controlling vortices originating at the tips of a rotor's blades. At least one movable flap is mounted at the trailing edge of each tip region of the rotor's blades. Each flap is deflected in an amount that causes boundary layer separation thereover as the blades rotate through the air at a revolution frequency f. Separation control device(s) are positioned at the leading edge regions of each flap. With the flaps deflected to bring about boundary layer separation, the separation control devices are actuated to periodically introduce perturbations into the air at the leading edge regions of the flaps. The periodic introduction of perturbations is controlled in accordance with a periodic frequency of introduction $f_0$. With the frequency of the perturbations so-introduced being designated as $f_e$, the periodic frequency of introduction $f_0$ satisfies the relationship $$nf \leq f_0 \leq f_e$$

where n is the number of blades.

DETAILED DESCRIPTION OF THE INVENTION

Figure 1:
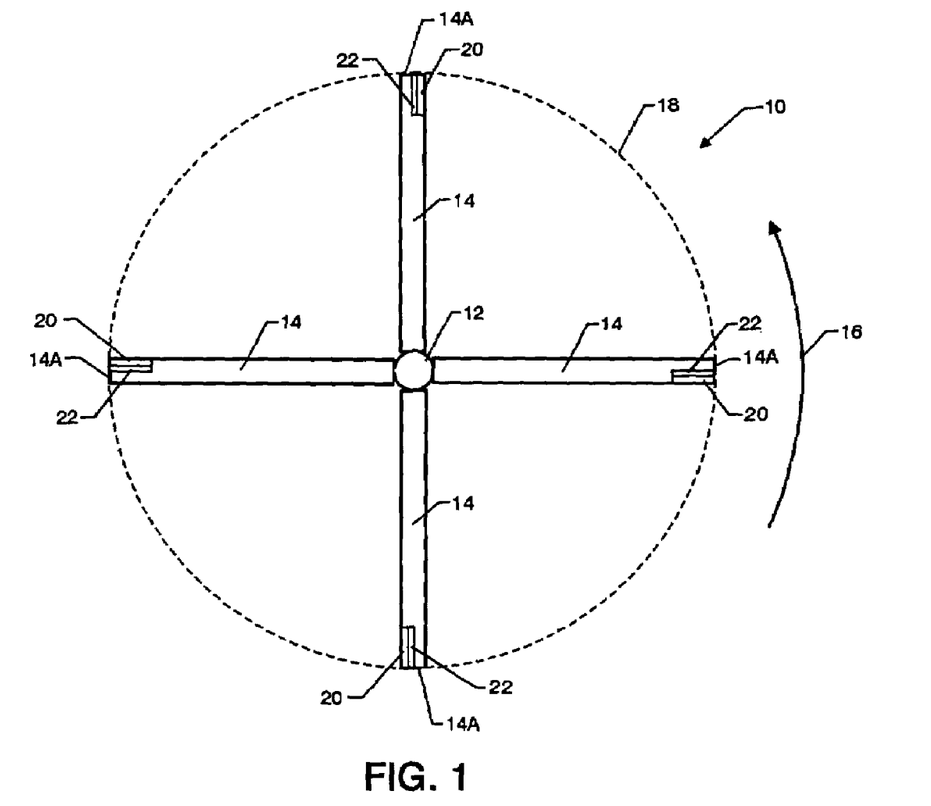
FIG. 1 is a plan view of a rotary blade assembly having flaps and corresponding separation control devices in accordance with the present invention.

Referring now to the drawings, and more particularly to FIG. 1, a plan view of a rotary blade assembly equipped for vortex control in accordance with the present invention is shown and is referenced generally by numeral 10. By way of example, the following description will be directed to a rotating blade assembly such as those used on rotorcraft. However, it is to be understood that the principles of the present invention can be applied to any rotary blade assembly. Rotary blade assembly 10 has a central rotating rotor hub 12 and a plurality of rotary wings or blades 14 coupled to rotor hub 12. While four of blades 14 are illustrated, more or fewer of blades 14 can be provided without limitation on the present invention. For purpose of this description, it will be assumed that rotary blade assembly 10 rotates counterclockwise as indicated by directional arrow 16. Accordingly, as assembly 10 rotates, blade tips 14A traverse a circular arc indicated by dashed line circle 18.

As assembly 10 rotates, vortices are generated at each of tips 14A. The present invention operates to control the tip-generated vortices by each of blades 14 to lessen or eliminate their effect on the following one of blades 14 in the direction of blade rotation. To do this, each of blades 14 has a movable flap 20 at the trailing edge thereof (relative to the direction of blade rotation). Each flap 20 is positioned to be immediately or nearly adjacent to the blade's tip 14A in what will be referred to herein as the blade's "tip region". A separation control device 22 is provided with each blade 14 or flap 20 such that, when activated, perturbations are introduced into the air at or near the leading edge (or what will hereinafter be referred to as the "leading edge region") of each flap 20 as assembly 10 rotates. The present invention uses flaps 20 and separation control devices 22 to control vortices that originate at tips 14A as assembly 10 rotates.

Figure 2:
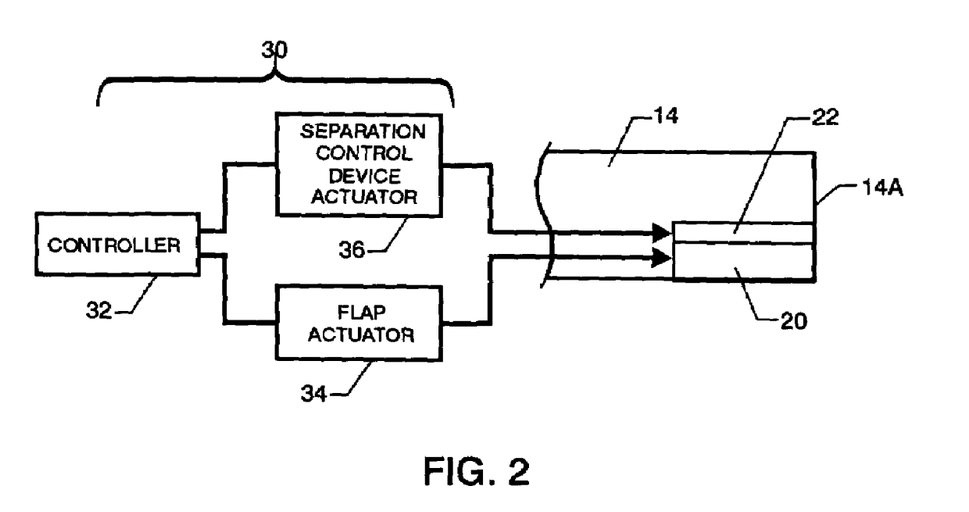
FIG. 2 is a block diagram of the system for controlling vortices at the tips of the rotary blades in accordance with the present invention.

Referring now to FIG. 2, a block diagram illustrates a control system 30 coupled to flap 20 and its separation control device 22 on one of blades 14. It is to be understood that control system 30 would be similarly coupled to the remaining flaps 20 and separation control devices 22 of assembly 10. Control system 30 includes a controller 32 programmed with the present invention's control methodology which, in turn, provides control inputs to each of a flap actuator 34 and a separation control device actuator 36.

The present invention's control methodology is a function of three different frequencies. The first of these frequencies is the frequency of rotation of assembly 10 and is designated herein as "f". The second of these frequencies is the frequency of the perturbations introduced by separation control devices 22 when devices 22 are actuated. The second frequency is designated herein as "$f_e$". The third frequency (designated herein as "$f_0$") is the frequency associated with the modulation (e.g., a periodic "on-off" modulating actuation cycle) of separation control devices 22. That is, the actuation of devices 22 in the present invention is governed by a periodic function (e.g., a square wave, triangle wave, sinusoidal wave, etc.) so that the generated perturbations are only periodically introduced into the air as assembly 10 rotates.

In general, the present invention perturbs the vortices that originate at blade tips 14A in a manner that will reduce or eliminate their effect on the next successive blade during the rotation of assembly 10. This can be achieved by deflecting the vortices, bursting the vortices, and/or diffusing the vortices. It has been found that one or more of these mechanisms are achieved by deflecting flaps 20 by an amount sufficient to cause at least some boundary layer separation of the airflow moving over flaps 20, while periodically introducing perturbations via the periodic actuation of separation control devices 22. When devices 22 are actuated, the airflow and entrained vortices are perturbed. More specifically, with flaps 20 deflected as assembly 10 rotates, the above-described three frequencies must satisfy the following relationships:

$$nf \leq f_0 \leq f_e \quad (1)$$

where n is the number of blades 14 in assembly 10.

Figure 3:
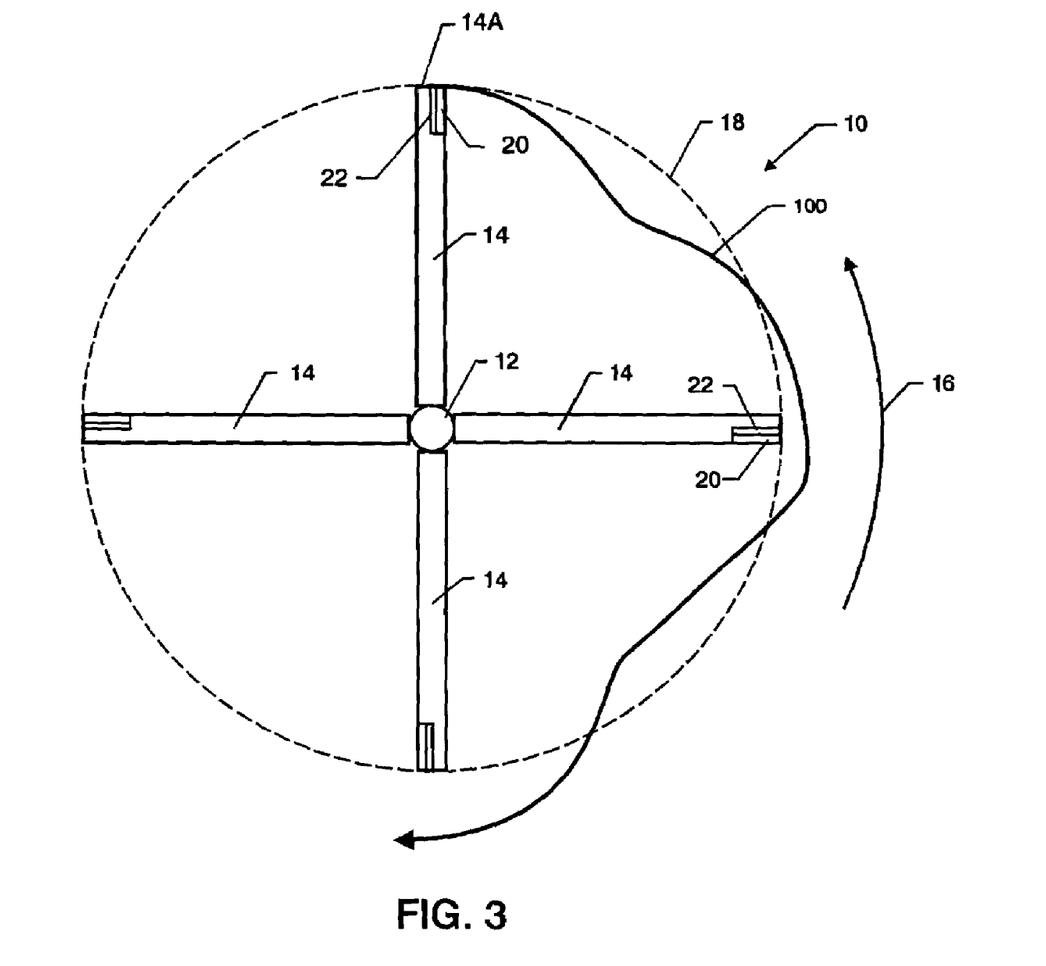
FIG. 3 illustrates a first possible mechanism for reducing blade-vortex interaction effects when implementing the present invention.

The above described mechanisms will be described in isolation to simplify the illustration thereof in FIGS. 3-5. Deflection of the vortices is illustrated in FIG. 3 where the vortex axis or path is indicated by path line 100. Path line 100 is affected such that the vortices traveling therealong miss the next successive blade 14 as assembly 10 rotates. This method is achieved by driving the actuation of separation control devices in accordance with $f_0 \geq nf$. Deflection of path line 100 can be in the plane of assembly 10 as well as out of the plane of assembly 10.

Figure 4:
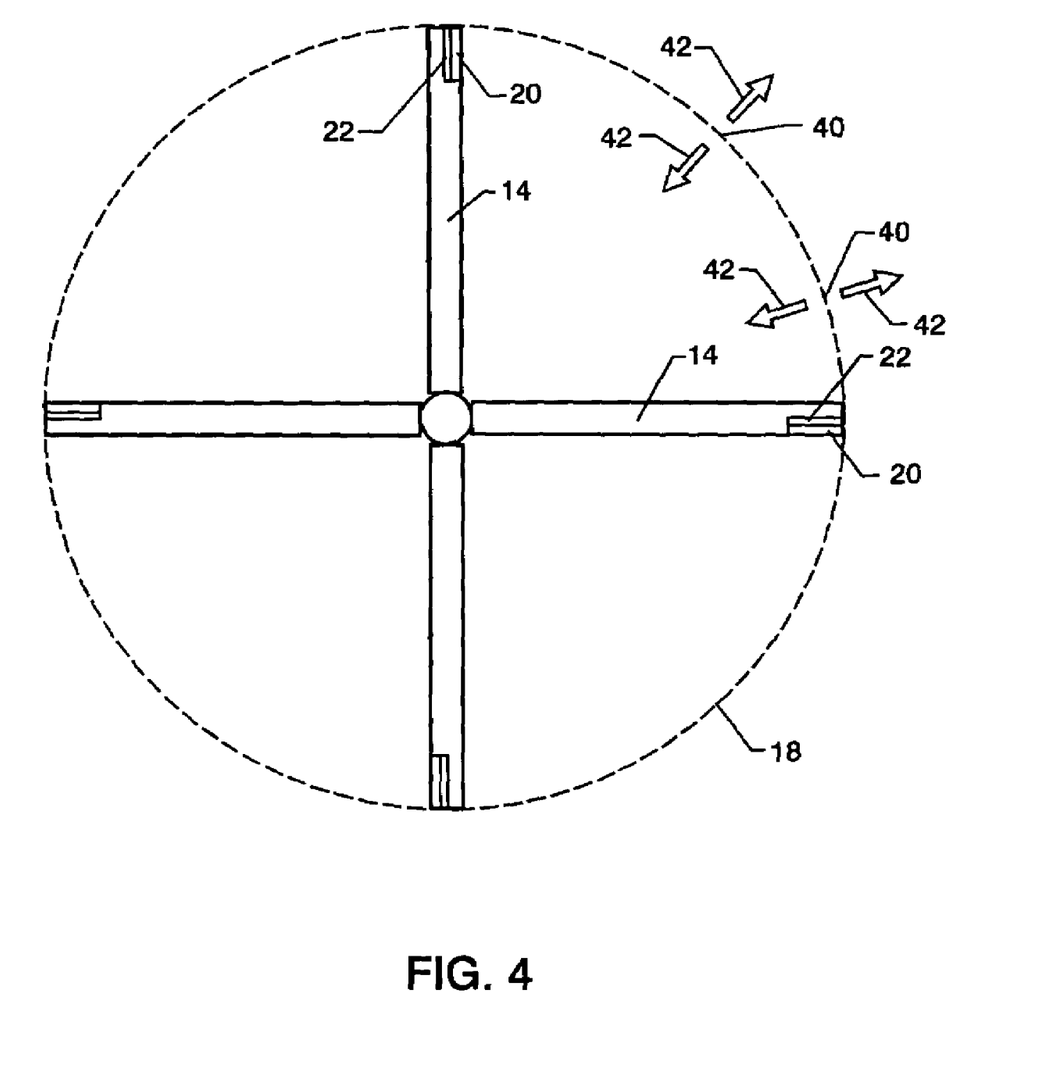
FIG. 4 illustrates a second possible mechanism for reducing blade-vortex interaction effects when implementing the present invention.

Bursting of the vortices is illustrated in FIG. 4 where vortices (not shown) burst at one or more locations 40 along the vortex axis or path as indicated by opposing arrows 42. Bursting of a vortex is achieved as the axial velocity in the vortex core changes direction thereby forcing a stagnation point in the vortex at locations 40. The stagnation forces the vortex core size to increase dramatically to effectively "burst" the vortex and, therefore, greatly reduce the impact of the vortex on the next successive blade 14 as assembly 10 rotates. If $f_0 = nf$, there will be n bursts per revolution of assembly 10. If $f_0 > nf$, there will be more than n bursts per revolution of assembly 10.

Figure 5:
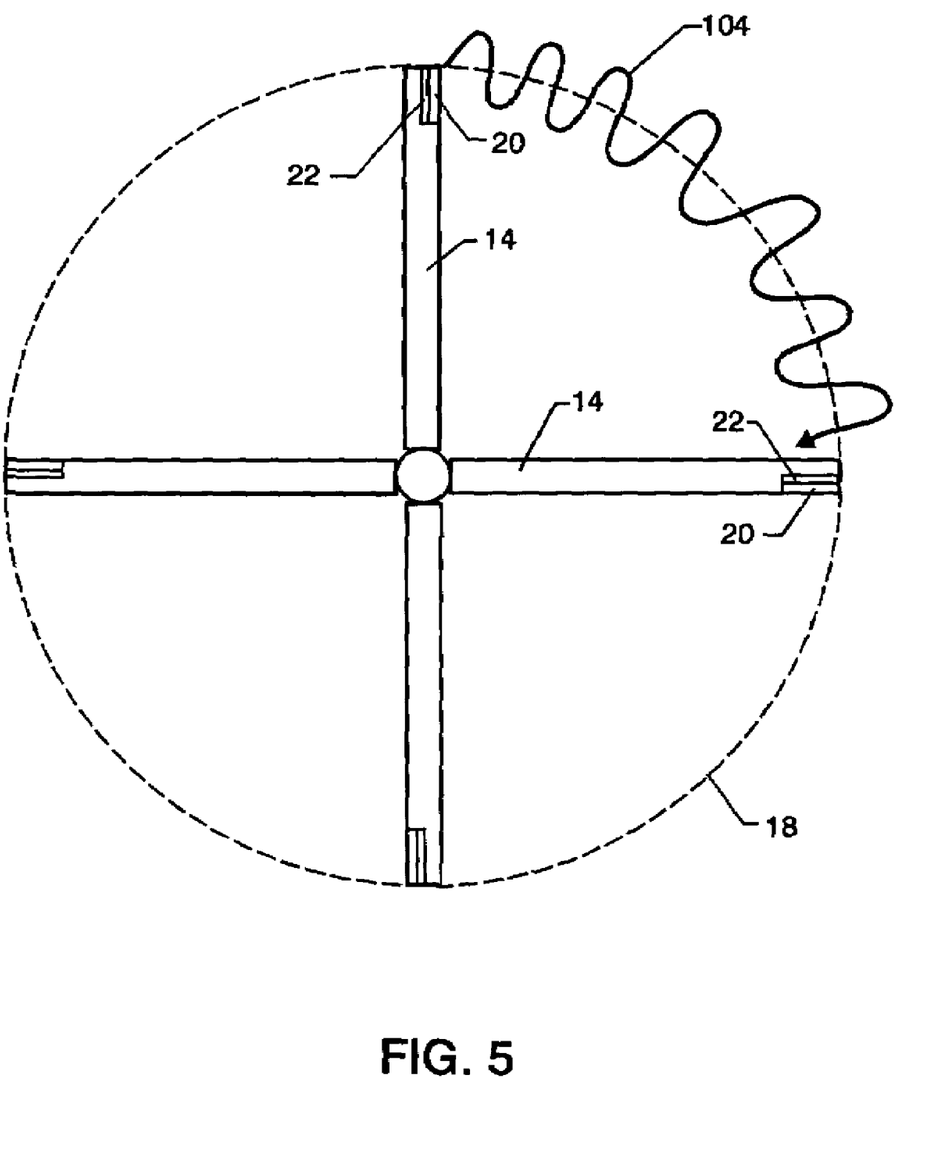
FIG. 5 illustrates a third possible mechanism for reducing blade-vortex interaction effects when implementing the present invention.

Diffusion of the vortices is illustrated in FIG. 5 where the vortex axis or path is referenced by path line 104. That is, path line 104 illustrates strong, short-wave undulations of the vortex path which operate to diffuse the strength of the vortex and thereby significantly lessen its impact on the next successive blade 14 as assembly 10 rotates. Such diffusion generally occurs at the upper range of $f_0$ provided that $f_0 \leq f_e$.

Figure 6:
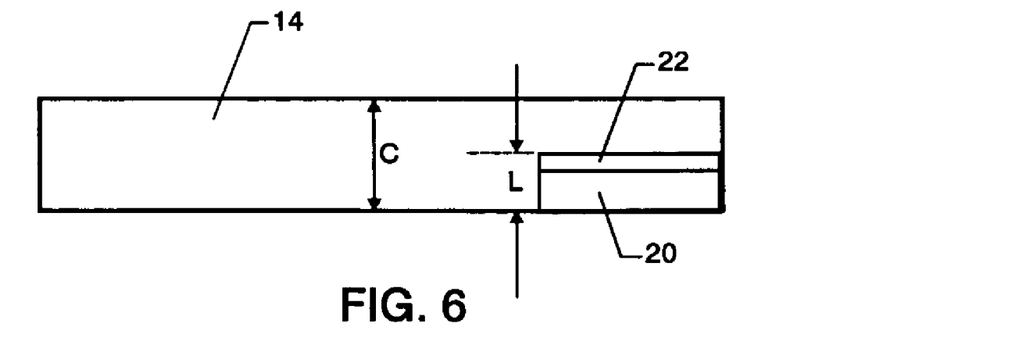
FIG. 6 is an isolated plan view of a rotary blade and its tip region flap illustrating various dimensions thereof.

The above-described frequency relationship in equation (1) can also be re-cast to be dimensionless. Specifically, the frequency of revolution of assembly 10 can be re-written as a dimensionless frequency "k"

$$k = nfc/V \quad (2)$$

where, as indicated in FIG. 6, c is the chord length of blade 14, and V is the speed at which tip 14A is moving as blade 14 rotates. The frequency of the perturbations $f_e$ can be re-written as a dimensionless frequency "$F^+$"

$$F^+ = f_e L/V \quad (3)$$

where L is the length of flap 20 as shown in FIG. 6. Substituting equations (2) and (3) into equation (1) yields the dimensionless relationship $$nkL/nc \leq f_0 L/V \leq F^+ \quad (4)$$

Figure 7A:
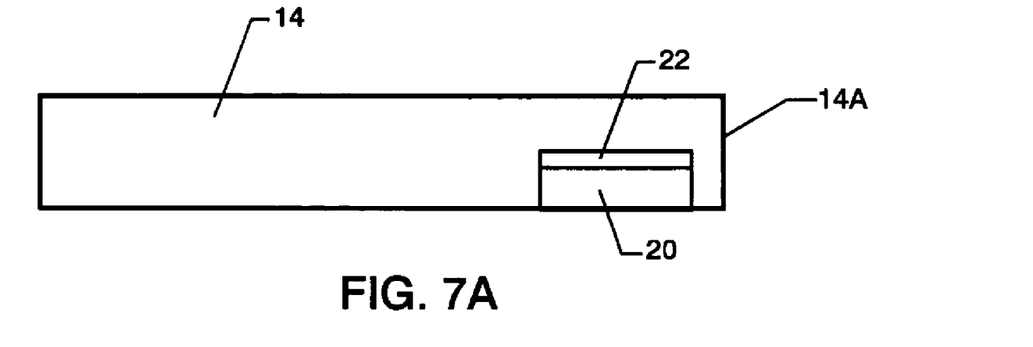
FIG. 7A is an isolated plan view of a rotary blade and a tip region flap in accordance with another embodiment of the present invention.
Figure 7B:
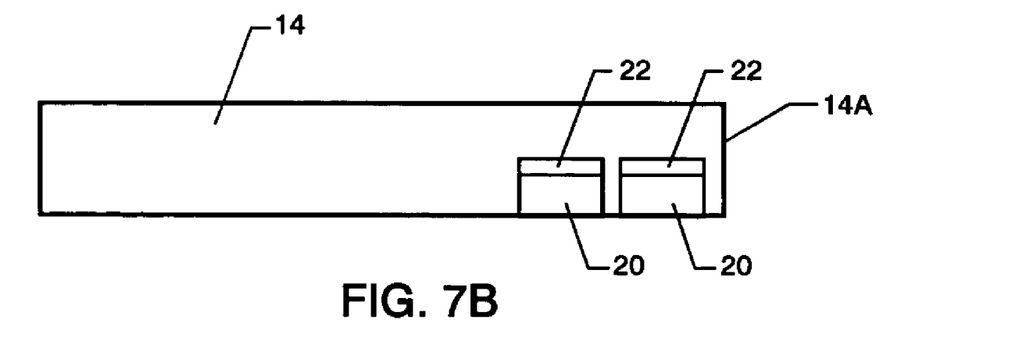
FIG. 7B is an isolated plan view of a rotary blade and two tip region flaps in accordance with another embodiment of the present invention.
Figure 7C:
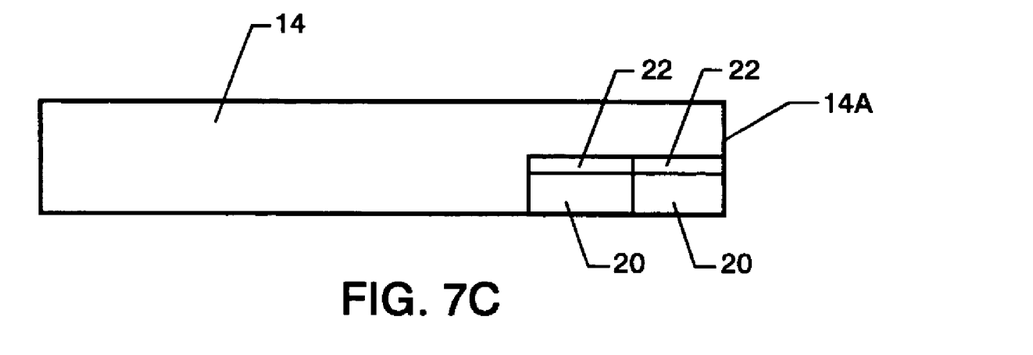
FIG. 7C is an isolated plan view of a rotary blade and two tip region flaps in accordance with another embodiment of the present invention.
Figure 7D:
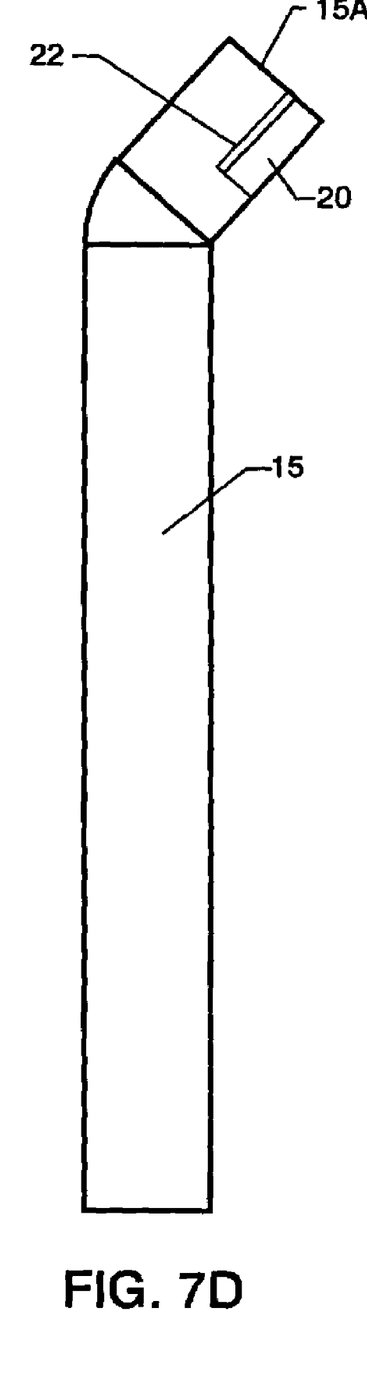
FIG. 7D is an isolated plan view of a rotary blade and a swept tip region that includes a flap in accordance with another embodiment of the present invention.
Figure 7E:
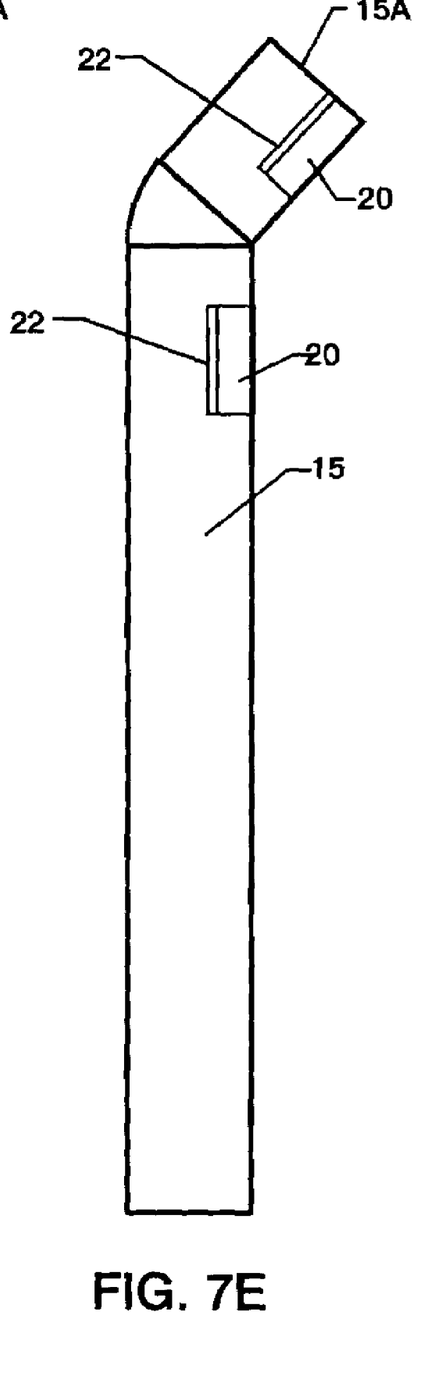
FIG. 7E is an isolated plan view of a rotary blade and its swept tip region that includes a flap on a main blade and on a swept tip region in accordance with another embodiment of the present invention.

Although described for one flap 20/separation control device 22 immediately adjacent blade tip 14A, the present invention is not so limited. Accordingly, a number of other rotorcraft blade/flap/separation control device embodiments are illustrated in FIGS. 7A-7E. In FIG. 7A, flap 20 and corresponding separation control device 22 are positioned inboard of tip 14A. In FIG. 7B, two spaced-apart flaps 20 and their corresponding separation control devices 22 are positioned in the tip region of blade 14. FIG. 7C illustrates two adjacent flaps 20 and their corresponding separation control devices 22 positioned immediately adjacent tip 14A. FIGS. 7D and 7E illustrate a rotorcraft blade 15 having a swept tip 15A. A single flap 20/separation control device 22 is positioned immediately adjacent swept tip 15A in FIG. 7D, whereas FIG. 7E also includes one flap 20/separation control device 22 positioned on the main portion of blade 15 near swept tip 15A.

A variety of separation control devices can be used in the present invention without departing from the scope thereof. A variety of such devices are disclosed in U.S. Patent Application No. 2005/0103944, the contents of which are hereby incorporated by reference. Typically, these devices will be active devices, driven by an energy source in accordance with a prescribed perturbation frequency $f_e$, and actuated (i.e., turned on) in accordance with the prescribed periodic function operating at the frequency $f_0$. The devices can be positioned such that their output element (e.g., slots in the case of a blowing or sucking separation control device; mechanical or piezoelectric flippers in the case of a mechanical separation control device, etc.) is positioned at or near the leading edge of flap 20, or in a shoulder or cove region (not shown) of blade 14 that provides for the hinged deflection of flap 20. As a result, the separation control devices introduce perturbations into the airflow at the leading edge region of their associated flap. The introduced perturbations can involve a zero or non-zero net-mass-flux.

The advantages of the present invention are numerous. The noise and efficiency problems created by blade vortex interaction in rotary wing aircraft and rotary blade equipment are reduced or eliminated. The system of the present invention is versatile in that there are several possible flap/separation control device combinations. The method of the present invention sets forth a simple multiple frequency parameter relationship that can be used to reduce or eliminate blade-tip vortex-induced noise and inefficiencies.

Although the invention has been described relative to a specific embodiment thereof, there are numerous variations and modifications that will be readily apparent to those skilled in the art in light of the above teachings. For example, if a rotary device's blade design is such that it, upon rotation, passively generates separated flow thereover at the tip region thereof (i.e., without the active deflection of tip region flap(s)), the principles of periodic perturbation introduction described herein could still be used. It is therefore to be understood that, within the scope of the appended claims, the invention may be practiced other than as specifically described.

What is claimed as new and desired to be secured by Letters Patent of the United States is:

1. A method of controlling vortices originating at the tips of a rotor's blades, comprising the steps of:
    providing at least one flap at the trailing edge of each tip region of the rotor's blades;
    deflecting each said flap to cause boundary layer separation thereover as the blades rotate through the air at a revolution frequency f; and
    periodically introducing perturbations into the air at leading edge regions of each said flap in accordance with a periodic modulating frequency of introduction $f_0$, wherein said $f_e$ is the frequency of said perturbations so-introduced, and wherein said periodic modulating frequency of introduction $f_0$ satisfies the relationship $$nf \leq f_0 \leq f_e$$

where n is the number of blades.

2. A method according to claim 1 wherein said perturbations are zero net-mass-flux perturbations.

3. A method according to claim 1 wherein said perturbations are non-zero net-mass-flux perturbations.

4. A method according to claim 1 wherein said step of periodically introducing perturbations is governed by a modulating function selected from the group consisting of a sinusoidal wave function, a square wave function, and a triangle wave function.

5. A system for controlling vortices originating at the tips of a rotor's blades, comprising:

at least one movable flap adapted to be mounted at the trailing edge of each tip region of the rotor's blades;
means for deflecting each said flap to cause boundary layer separation thereover as the blades rotate through the air at a revolution frequency f; and
means, positioned at leading edge regions of each said flap, for periodically introducing perturbations into the air at leading edge regions of each said flap in accordance with a periodic modulating frequency of introduction $f_0$, wherein said $f_e$ is the frequency of said perturbations so-introduced, and wherein said periodic modulating frequency of introduction $f_0$ satisfies the relationship $$nf \leq f_0 \leq f_e$$

where n is the number of blades.

6. A system as in claim 5 wherein said means for periodically introducing perturbations comprises separation control devices generating zero net-mass-flux perturbations.

7. A system as in claim 5 wherein said means for periodically introducing perturbations comprises separation control devices generating non-zero net-mass-flux perturbations.

8. A system as in claim 5 wherein said means for periodically introducing perturbations is governed by a modulating function selected from the group consisting of a sinusoidal wave function, a square wave function, and a triangle wave function.

9. A vortex-controlling rotor blade system, comprising:
    a rotor having n rotary blades coupled thereto;
    at least one movable flap adapted to be mounted at the trailing edge of each tip region of each of said rotary blades;
    means for deflecting each said flap to cause boundary layer separation thereover as said rotary blades rotate through the air at a revolution frequency f; and
    means, positioned at leading edge regions of each said flap, for periodically introducing perturbations into the air at leading edge regions of each said flap in accordance with a periodic modulating frequency of introduction $f_0$, wherein said $f_e$ is the frequency of said perturbations so-introduced, and wherein said periodic modulating frequency of introduction $f_0$ satisfies the relationship $$nf \leq f_0 \leq f_e.$$

10. A vortex-controlling rotor blade system as in claim 9 wherein said means for periodically introducing perturbations comprises separation control devices generating zero net-mass-flux perturbations.

11. A vortex-controlling rotor blade system as in claim 9 wherein said means for periodically introducing perturbations comprises separation control devices generating non-zero net-mass-flux perturbations.

12. A vortex-controlling rotor blade system as in claim 9 wherein said means for periodically introducing perturbations is governed by a modulating function selected from the group consisting of a sinusoidal wave function, a square wave function, and a triangle wave function.

13. A method of controlling vortices originating at the tips of a rotor's blades, comprising the steps of:
    providing n blades coupled to a rotor hub wherein each tip region of the blades comprises a flap which causes boundary layer separation of an airflow moving thereover as the blades rotate through the air at a revolution frequency f; and
    periodically introducing perturbations into the air at leading edge regions of each said flap in accordance with a periodic modulating frequency of introduction $f_0$, wherein said $f_e$ is the frequency of said perturbations so-introduced, and wherein said periodic modulating frequency of introduction $f_0$ satisfies the relationship $$nf \leq f_0 \leq f_e.$$

14. A method according to claim 13 wherein said perturbations are zero net-mass-flux perturbations.

15. A method according to claim 13 wherein said perturbations are non-zero net-mass-flux perturbations.

16. A method according to claim 13 wherein said step of periodically introducing perturbations is governed by a modulating function selected from the group consisting of a sinusoidal wave function, a square wave function, and a triangle wave function.

* * * * *